United States Patent [19]

Lederer et al.

[11] 4,192,797

[45] Mar. 11, 1980

[54] SUSPENSION POLYMERIZATION

[75] Inventors: Michael Lederer, Königstein, Fed. Rep. of Germany; Antonius J. M. Bouman, Oosterhout, Netherlands

[73] Assignee: Hoechst Aktiengesellschaft, Frankfurt am Main, Fed. Rep. of Germany

[21] Appl. No.: 809,433

[22] Filed: Jun. 23, 1977

[30] Foreign Application Priority Data

Jun. 26, 1976 [DE] Fed. Rep. of Germany ....... 2628761

[51] Int. Cl.$^2$ ................................................ C08F 2/20
[52] U.S. Cl. ........................................ 525/243; 526/67; 526/70
[58] Field of Search ................... 526/67, 70, 346; 260/4 AR, 878 R, 880 R, 886

[56] References Cited

U.S. PATENT DOCUMENTS

| 3,488,745 | 1/1970 | Wright | 526/346 |
|---|---|---|---|
| 3,935,148 | 1/1976 | Childers et al. | 526/67 |
| 4,017,670 | 4/1977 | Spicuzza, Jr. et al. | 526/346 |

OTHER PUBLICATIONS

Zurnev et al., "Multiple Use of Waste Water in the Production of Bulk-Suspension High Impact Polystyrene", *Plasticheskie Massy*, No. 5, 1975, p. 51 (Translation: *International Polymer Science and Technology*, vol. 2, No. 12 (1975), pp. T/103–T/104).

*Primary Examiner*—Paul R. Michl
*Attorney, Agent, or Firm*—Curtis, Morris & Safford

[57] ABSTRACT

There is described an improved process for the discontinuous suspension polymerization of alkenyl-aromatic compounds, which comprises re-using the aqueous polymerization medium, after separation of the polymer beads, as the polymerization medium of a subsequent polymerization. Monomer-soluble and water-soluble initiators and, optionally fresh water and dispersing agent, are added. Re-using the aqueous polymerization medium does not negatively affect the color and mechanical properties of the polymer obtained. The process of the invention results in considerable saving of energy.

6 Claims, No Drawings

SUSPENSION POLYMERIZATION

In the production of bead polymers in aqueous suspension there are obtained, besides the polymer beads which can be readily separated by mechanical means, varying amounts of emulsion polymer and graft polymers formed by grafting of the monomers onto the aqueous dispersing agent used. The aqueous phase further contains small proportions of the monomers.

For the reason of environmental protection the waste waters have to be purified. A merely mechanical purification is practically impossible because of the good stabilization against precipitation of the suspended matter in the waste water by the dispersing agents present and the graft polymers formed during polymerization.

Expensive processes have been proposed according to which waste waters of this type can be purified. DT-OS No. 2,140,192 describes a process for the clarification of waste waters, wherein monomers having a photopolymerizable double bond are added to the waste water and polymerization is brought about in the congealed state by irradiation. After thawing, the solid matter is eliminated by sedimentation, centrifugation and filtration.

According to DT-OS No. 2,150,056 the waste waters of the styrene polymerization are treated, while heating, with 0.02 to 5% by weight, of sodium, potassium or ammonium persulfate whereby the suspended matter coagulates.

DT-OS No. 2,209,989 provides a process wherein a current of finely divided gas bubbles is passed through the waste water. In this manner a foam is formed in which the suspended matter concentrates. The foam is separated and the aqueous phase is subjected to a post-purification.

All these processes impose a considerable economic burden on the final products.

In DT-OS No. 2,519,949 a process is described for the free radical initiated polymerization of vinyl monomers in suspension in which block polymers of the AB type prepared in a special manner are used as suspension auxiliary. In the said copolymers A means a lipophilic structural unit and B a hydrophilic structural unit which is preferably quaternized by means of strong acids or bases and in the case of anhydride groups these are transformed into salts by strong bases. In said specification it is mentioned that the dispersion medium can be re-used for a new polymerization cycle. The proportion of the monomer phases to water is in the range of from 1:7 to 1:1.

Attempts have been made (cf. Plasticheskie Massy, no. 5, 1975, page 51) to re-use the aqueous phase in the production of impact resistant polystyrene by the mass suspension process using tricalcium phosphate (TCP) insoluble in water. But in this process the color and the impact resistance of the products is detrimentally affected.

To carry out a bead polymerization a monomer is dispersed in the aqueous phase in the form of small droplets with the aid of a dispersing agent and the polymerization is started by means of initiators soluble in the monomer. The polymer is obtained in the form of beads and can be readily separated from the aqueous phase.

The present invention provides an improvement in the process for the production of bead polymers (suspension polymers) by batch-wise (dicontinuous) polymerization of alkenyl-aromatic compounds in aqueous phase in the presence of water-soluble dispersing agents and monomer-soluble initiators under known conditions and separation of the polymer beads from the aqueous medium, which comprises using as aqueous phase the medium obtained in the previous polymerization, adding to the said aqueous phase from 0 to 60%, preferably 5 to 30%, by weight of fresh water, calculated on the aqueous phase, from 0 to 70%, preferably 10 to 50%, by weight of the amount of dispersing agent added in the first polymerization, 0.05 to 5% by weight, calculated on the organic phase, of monomer-soluble initiators and from 2 to 200, preferably 5 to 50, ppm, calculated on the organic phase, of a water-soluble initiator.

Suitable alkenyl-aromatic compounds to be polymerized by the process according to the invention are, for example, styrene, α-methylstyrene, styrenes carrying alkyl radicals at the benzene nucleus such as o-, m- and p-vinyltoluenes, the isomeric vinylxylenes, o-, m- and p-ethylvinylbenzenes, styrenes carrying halogen atoms at the benzene nucleus such as o-, m- and p-chloro- and -bromo-styrenes, and styrenes in which the benzene nucleus is hydrogenated such as 1,2-methylvinylcyclohexane, 1,3-methylvinylcyclohexane, 1,4-methylvinylcyclohexane, 1,2-ethylvinylcyclohexane.

It is also possible to copolymerize with one another two or more than two of the aforesaid monomeric alkenyl-aromatic compounds.

Alternatively, solutions of one or several of the aforesaid monomers can be graft-polymerized with a natural or synthetic rubber (elastomer).

According to a preferred embodiment of the process of the invention so called pre-polymers are polymerized, i.e. mixtures of monomeric alkenyl-aromatic compounds with a polymer formed in a previous stage, for example a stage of bulk polymerization.

In a special case, to produce impact resistant poylstyrene the monomer is used in the bead polymerization in admixture with graft polymers of alkenyl-aromatic monomers on rubber. This pre-polymer is dispersed in the aqueous phase like a monomer and polymerization is completed with the aid of initiators soluble in the organic phase.

Suitable elastomers are, for example, polybutadiene over 90% of which consist of cis-1,4-structural units, polybutadiene consisting of more than 30% of cis-1,4-structural units, over 40% of trans-1,4-structural units and at most 12% of 1,2-vinyl groups, polyisoprene, butadiene/styrene rubber, or ethylene/propylene/tercomponent rubber.

Suitable ethylene/propylene/tercomponent rubbers are those obtained by polymerization of 70 to 30% by weight of ethylene, 70 to 30% by weight of propylene and 0.5 to 15% by weight of a diolefin as third component (tercomponent), calculated on the amount of ethylene plus propylene. Diolefins that can be used as third components are, for example, those having at least 5 carbon atoms the double bonds of which are conjugated or, preferably, not conjugated, such as 5-ethylidenenorbornene-1,dicyclopentadiene, 2,2,1-bicycloheptadiene and 1,4-hexadiene.

The said elastomers are suitably used in an amount of from 1 to 20% by weight, preferably 4 to 15% by weight, calculated on the monomer.

As dispersing agents there can be used the known non ionic high molecular weight, water-soluble compounds such as polyvinyl alcohol, polyvinyl pyrrolidone and the copolymers thereof with vinyl esters or acrylic esters, cellulose ethers, gelatin, copolymer of N-vinyl- N-methylacetamide with acrylic esters. The said compounds are used in an amount of from 0.05 to 5% by weight, calculated on the monomer(s). Preferred dispersing agents are the copolymers of N-vinyl-N-methylacetamide with acrylic esters in a proportion of from 80:20 to 99.9:0.1 in which the alcohol moiety in the acrylic ester contains from 1 to 19 carbon atoms in a straight or branched chain.

In addition, ionic emulsifiers can be added, for example alkyl sulfonates, alkylaryl sulfonates and polyethylene sulfonates, in an amount of from 0.0001 to 0.1% by weight, calculated on the organic phase.

Suitable initiators are alkyl hydroperoxides, dialkylperoxides, diacyl peroxides, peroxyesters, and ketone peroxides, soluble in the monomer. They are used in an amount of from 0.05 to 2%, calculated on the organic phase.

As water-soluble initiators small amounts of from 2 to 200 ppm, preferably 5 to 50 ppm, calculated on the organic phase, of sodium, potassium or ammonium persulfate or cyclohexylcarbonato-K-sulfonato peroxide (CPS) are used.

The bead polymerization is suitably carried out with a very narrow proportion of organic phase to water which is in the range of from 1:3 to 3:1, preferably 1:1.5 to 2:1. The polymerization temperature is in the region of from 50° to 150° C.

According to a preferred embodiment of the process of the invention the polymer is separated after polymerization in a filter, decanter or centrifuge and the solids content of the aqueous phase is determined gravimetrically. The amount of dispersing agent is chosen in dependence on the solids content. In the range of from 0.4 to 1% of solids content, 0 to 70% by weight, preferably 10 to 50% by weight, of the originally used amount (in the previous bead polymerization) of dispersing agent is added. With a high solids content above 1% the addition of dispersing agent may even be dispensed with. The aqueous phase resulting from a previous suspension polymerization can be diluted with 0 to 60%, preferably 5 to 30%, of fresh water.

The process of the invention has no pollutant effect on the environment. The residual monomer and emulsifier portion contained in the aqueous phase and the graft polymers of the monomer onto the dispersing agent formed in the course of the polymerization are recycled into the polymerization. It could be ascertained that this procedure does not affect to a noticeable degree the properties of the final products. A further economical aspect, as compared with known processes, is that less water and only 0 to 70% of the amount of dispersing agent used in the first of a series of suspension polymerizations need be added. The savings in energy are considerable.

In the manufacture of impact resistant polystyrene the process according to the invention is distinguished by surprising technical advantages. A deposit formation in the reactor is avoided to a noticeable extent. While, with a single use of the polymerization medium, the reactor has to be cleaned after 8 charges, a cleaning after 14 charges at the earliest is necessary in the process of the invention.

The following examples illustrate the invention

EXAMPLE 1

At first a pre-polymer having a polymer content of 35% was prepared by a known bulk polymerization process from styrene and 6% by weight of a commercial polybutadiene rubber containing over 90% of cis-1,4-structural units (pre-polymer 1).

Each time 100 parts by weight of prepolymer 1 were polymerized in aqueous suspension in a 2 liter round flask with stirrer, with the exclusion of air, for 6 hours at 90° C. and for 7 hours at 98° C. The polymer beads obtained were separated from the aqueous phase by filtration, dried and compression molded into small plates.

(a) The initial suspension medium was prepared from
  0.37 part by weight of dibenzoyl peroxide
  0.15 part by weight of tert.butyl perbenzoate
  100 parts by weight of desalted water
  0.15 part by weight of N-vinyl-N-methylacetamide (96% by weight)/2-ethylhexylacrylate (4% by weight) copolymer (dispersing agent A)
  0.002 part by weight of polyethylene sulfonate (PES)
  0.001 part by weight of potassium persulfate (KPS)
(b) and (c) The suspension medium used in the subsequent polymerization was prepared from
  0.3 part by weight of tert.butyl peroctoate
  0.12 part by weight of tert.butyl peracetate
  200 parts by weight of the medium of the preceding polymerization (1(a) or 1(b), respectively)
  0.005 part by weight of KPS The repeated use of the aqueous suspension medium resulting from the preceding polymerization experiment had no influence on the color of the molded plates.

(d) Polymerization 1(c) was repeated but without the addition of KPS. Coagulation did occur.

EXAMPLE 2

First a pre-polymer having a polymer content of 33% (pre-polymer 2) was prepared by a known bulk polymerization process from styrene and 8% by weight of a commercial polybutadiene rubber consisting of 39% of cis-1,4-structural units, 53% of trans-1,4-structural units and 9% of 1,2-vinyl structural units.

Each time 100 parts by weight of the pre-polymer 2 were polymerized with the exclusion of air in a 60 liter autoclave for 8 hours at 88° C. and for 6 hours at 130° to 135° C. The polymer beads obtained were separated from the aqueous phase by filtration, dried, granulated at 220° C. and injection molded into plates.

(a) As suspension medium the aqueous phase as used in polymerization experiment 1(a) was used.
(b) to (f) The aqueous phase used as suspension medium was composed of
  0.37 part by weight of dibenzoyl peroxide
  0.15 part by weight of tert.butyl perbenzoate
  100 parts by weight of the polymerization medium of the preceding polymerization batch (2(a) or 2(b), and so on)
  0.05 part by weight of dispersing agent A
  0.0005 part by weight of PES
  0.001 part by weight of KPS
(g) and (h) These experiments were carried out in the same manner as experiments 2(b) to 2(f) with the exception that no dispersing agent A was added. In experiments 2(b)–2(h) the injection molded plates obtained had the same color and the same notched impact strength (measured according to DIN 53 453) as in experiment 2(a).

EXAMPLE 3

(with replacement of 10% of the medium of a previous polymerization experiment by fresh water)

The suspension polymerization experiments of this example were carried out under the same conditions as to apparatus, time and temperature as in Example 2, each time with 100 parts by weight of pre-polymer 2. The bead polymers obtained were separated from the aqueous phase by filtration, dried, granulated and molded into plates.

(a) The aqueous phase used as suspension medium was prepared from
   0.3 part by weight of dibenzoyl peroxide
   0.15 part by weight of tert.butyl perbenzoate
   70 parts by weight of desalted water
   0.12 part by weight of dispersing agent A
   0.03 part by weight of N-vinyl-N-methyl-acetamide (91.5% by weight)/2-ethylhexyl acrylate (8.5% by weight) copolymer (dispersing agent B)
   0.002 part by weight of PES
   0.001 part by weight of KPS (b1) to (b7) The aqueous phase used as suspension medium was composed of
   0.3 part by weight of dibenzoyl peroxide
   0.15 part by weight of tert.butyl perbenzoate
   63 parts by weight of the medium of the preceding polymerization batch (3(a) or 3(b1) or 3(b2) etc.)
   7 parts by weight of desalted water
   0.04 part by weight of dispersing agent A
   0.01 part by weight of dispersing agent B
   0.0005 part by weight of PES
   0.001 part by weight of KPS (c1) to (c9) The aqueous phase used as suspension medium was composed of
   0.3 part by weight of dibenzoyl peroxide
   0.15 part by weight of tert.butyl perbenzoate
   58.5 parts by weight of the medium of the preceding polymerization batch (3(b7) or 3(c1) or 3(c2) etc.)
   6.5 parts by weight of desalted water
   0.04 part by weight of dispersing agent A
   0.01 part by weight of dispersing agent B
   0.0005 part by weight of PES
   0.0006 part by weight of KPS As compared with the plates of experiment 3(a), the plates of experiments 3(b1) to 3(c9) did not show any change in color. The notched impact strength was not affected either by the re-use of the aqueous phase of the preceding polymerization.

After experiments 3(c7), i.e. after having carried through 15 polymerization experiments, the reactor had to be cleaned. As compared therewith, the reactor had to be cleaned already after 8 repetitions of experiment 3(a).

EXAMPLE 4

A pre-polymer 3, having a polymer content of 35% and prepared by a known bulk polymerization from styrene and 10% by weight of a commercial ethylene/propylene/tercomponent rubber, the tercomponent being 5-ethylidene-norbornene-2, was used.

The suspension polymerization experiments of this example were carried out under the same conditions as to apparatus, time and temperature as in Example 2, each time with 100 parts by weight of pre-polymer 3. The polymer beads obtained were separated from the aqueous phase by filtration, dried, granulated at 220° C. and injection molded into plates.

(a) The suspension medium used was prepared from
   0.3 part by weight of tert.butyl peroctoate
   0.2 part by weight of tert.butyl perbenzoate
   120 parts by weight of desalted water
   0.18 part by weight of dispersing agent B
   0.003 part by weight of PES
   0.005 part by weight of KPS (b1) to (b6) The aqueous suspension medium used was composed of
   0.3 part by weight of tert.butyl peroctoate
   0.2 part by weight of tert.butyl perbenzoate
   90 parts by weight of the polymerization medium of the preceding polymerization batch (4(a) or 4(b1) or 4(b2) etc.)
   10 parts by weight of desalted water
   0.1 part by weight of dispersing agent B
   0.0013 part by weight of PES
   0.001 part by weight of KPS (c1) to (c6) The aqueous suspension medium used was composed of
   0.3 part by weight of tert.butyl peroctoate
   0.2 part by weight of tert.butyl perbenzoate
   81 parts by weight of the aqueous phase of the preceding polymerization (4(b6) or 4(c1) or 4(c2) etc.)
   9 parts by weight of desalted water
   0.1 part by weight of dispersing agent B
   0.0013 part by weight of PES
   0.001 part by weight of KPS (d1) to (d8) The aqueous suspension medium used was composed of
   0.3 part by weight of tert.butyl peroctoate
   0.2 part by weight of tert.butyl perbenzoate
   72 parts by weight of the aqueous phase of the preceding polymerization batch (4(c6) or 4(d1) or 4(d2) etc.)
   8 parts by weight of desalted water
   0.1 part by weight of dispersing agent B
   0.0013 part by weight of PES
   0.001 part by weight of KPS It was only after 17 polymerization experiments [4(a) to 4(d4)] that the reactor had to be cleaned. As compared therewith, cleaning of the reactor was necessary after 8 performances of experiment 4(a). The plates of experiments 4(b1) to 4(d8) had the same color as a plate of experiment 4(a).

What is claimed is:

1. A process for the production of bead polymers which consists of the steps of first polymerizing an organic monomer phase comprising an alkenyl-aromatic compound having a monomer-soluble initiator dissolved thereby by suspension polymerization in an aqueous reaction medium in the presence of only water-soluble dispersing agents, to form polymer beads suspended in a mixture of said aqueous reaction medium and said organic monomer phase, separating the polymer beads from said mixture, adding to the mixture from 0 to 60% by weight of fresh water, based on the weight of aqueous reaction medium, from 0 to 70% by weight of the amount of water-soluble dispersing agent used in said first polymerization step, from 0.05 to 5% by weight, based on the weight of the organic monomer phase, of monomer-soluble initiator, and from 2 to 200 ppm, based on the weight of organic monomer phase, of a water-soluble initiator, and using the thus modified mixture as a reaction medium for polymerization of a further quantity of said alkenyl-aromatic compound.

2. The process of claim 1, which comprises adding to the aqueous phase from 5 to 30% by weight of fresh water, from 10 to 50% by weight of the amount of dispersing agent added in the first polymerization, and from 5 to 50 ppm of a water-soluble initiator.

3. The process of claim 1, wherein styrene in which a natural or synthetic rubber has been dissolved is polymerized in an aqueous phase obtained after the termination of a previous suspension polymerization of styrene in the presence of a natural or synthetic rubber after separation of the polymer beads.

4. The process of claim 3, wherein the rubber is an ethylene/propylene/tercomponent rubber.

5. The process of claim 1, wherein a pre-polymer from styrene and a natural or synthetic rubber containing a graft polymer of the said components and excess styrene is polymerized in an aqueous phase obtained after termination of a previous suspension polymerization of styrene in the presence of a natural or synthetic rubber after separation of the polymer beads.

6. A process according to claim 1 wherein the dispersing agent is a copolymer of an N-vinyl-N-alkyl-acetamide.

* * * * *